United States Patent
Hsu et al.

(10) Patent No.: US 8,164,620 B2
(45) Date of Patent: Apr. 24, 2012

(54) STEREO PROJECTION OPTICAL SYSTEM

(75) Inventors: Chien-Wen Hsu, Taipei Hsien (TW);
Chia-Hung Kao, Taipei Hsien (TW);
Huan-Liang Lo, Taipei Hsien (TW);
Sheng-Chung Huang, Taipei Hsien (TW)

(73) Assignee: Hon Hai Precision Idnustry Co., Ltd., Tu-Cheng, New Taipei (TW)

(*) Notice: Subject to any disclaimer, the term of this patent is extended or adjusted under 35 U.S.C. 154(b) by 1172 days.

(21) Appl. No.: 11/952,982

(22) Filed: Dec. 7, 2007

(65) Prior Publication Data
US 2009/0079885 A1  Mar. 26, 2009

(30) Foreign Application Priority Data
Sep. 24, 2007  (CN) .......................... 2007 1 0201838

(51) Int. Cl.
*H04N 13/04* (2006.01)
(52) U.S. Cl. ....... 348/51; 348/751; 353/30; 359/487.01; 359/487.04; 359/489.01; 359/489.07; 359/489.09
(58) Field of Classification Search .................... 348/51, 348/751; 353/30; 359/487.01, 487.04, 489.01, 359/489.07, 489.09
See application file for complete search history.

(56) References Cited

U.S. PATENT DOCUMENTS

| 5,815,221 A * | 9/1998 | Kojima et al. ................. 348/751 |
| 6,522,351 B1 | 2/2003 | Park |
| 2004/0169824 A1 * | 9/2004 | Newell et al. .................... 353/30 |

FOREIGN PATENT DOCUMENTS
JP  7270780 A  10/1995
* cited by examiner

*Primary Examiner* — Yves Dalencourt
(74) *Attorney, Agent, or Firm* — Altis Law Group, Inc.

(57) ABSTRACT

A stereo projection optical system includes an image engine configured for providing light superimposed spatial information, a color selector positioned to receive a light output of the image engine, a transmission-type light modulator positioned to receive an emergent light of the color selector. The color selector is configured for selectively modifying the polarization of the light output according to the wavelength of the light output. The transmission-type light modulator alternates between a dark state and a bright state. From the foregoing, it will be apparent that the stereo projection optical system according to the present invention provides advantages in that its structure can be simplified with the reduction of its size by synthesizing lift and right image signals by displaying the stereoscopic image signal using a single projector.

16 Claims, 7 Drawing Sheets

STEREO PROJECTION OPTICAL SYSTEM

CROSS REFERENCE TO RELATED APPLICATION

This application is related to a co-pending U.S. patent application Ser. No. 11/947,086, entitled "STEREO PROJECTION OPTICAL SYSTEM", which was filed on Nov. 29, 2007, which is now abandoned, and is assigned to the same assignee as the present application. The disclosure of the above-identified application is incorporated herein by reference.

RELATED FIELD

The present invention relates generally to projection optical systems, and more specifically to a stereo projection optical system.

BACKGROUND

A conventional stereoscopic image display apparatus for displaying a stereoscopic image on a display screen is shown in FIG. 7, uses a pair of image signals generated by two video cameras 42 and 43 located at a predetermined distance from an object 41 at with predetermined separation therebetween. The pair of image signals is then displayed on a single display screen 46 by two display devices 44 and 45, respectively, overlapping each other.

However, such conventional stereoscopic image display apparatuses have drawbacks in that they require two separate projections in order that two images, i.e., the left and right images, may be overlappingly displayed on a single display screen. The stereoscopic image display apparatus is thus bulky and complicated.

It is desired to provide a stereo projection optical system which can overcome the above-described deficiencies.

SUMMARY

In accordance with a present embodiment, a stereo projection optical system includes an image engine configured for providing light beams superimposed spatial information, a color selector positioned to receive the light beams from the image engine, and a transmission-type light modulator positioned to receive an light output from the color selector. The color selector is configured for selectively modifying the polarization of the light output according to wavelengths of the light beams. The transmission-type light modulator switchably operates between a dark state and a bright state. When the transmission-type light modulator is in dark state, it transmits the light output. When the transmission-type light modulator is in bright state, it changes polarization of the light output into a light beam polarization of which is orthogonal to the light output and emitting the light beam.

Other novel features and advantages will become more apparent from the following detailed description when taken in conjunction with the accompanying drawings.

BRIEF DESCRIPTION OF THE DRAWINGS

The present invention is described in detail hereinafter, by way of example and description of preferred and exemplary embodiments thereof and with reference to the accompanying drawings in which.

DETAILED DESCRIPTION OF THE PREFERRED EMBODIMENTS

A detailed explanation of a stereo projection optical system for projection displays according to each of various embodiments of the present invention will now be mage with reference to the drawings attached hereto.

Figure 1:
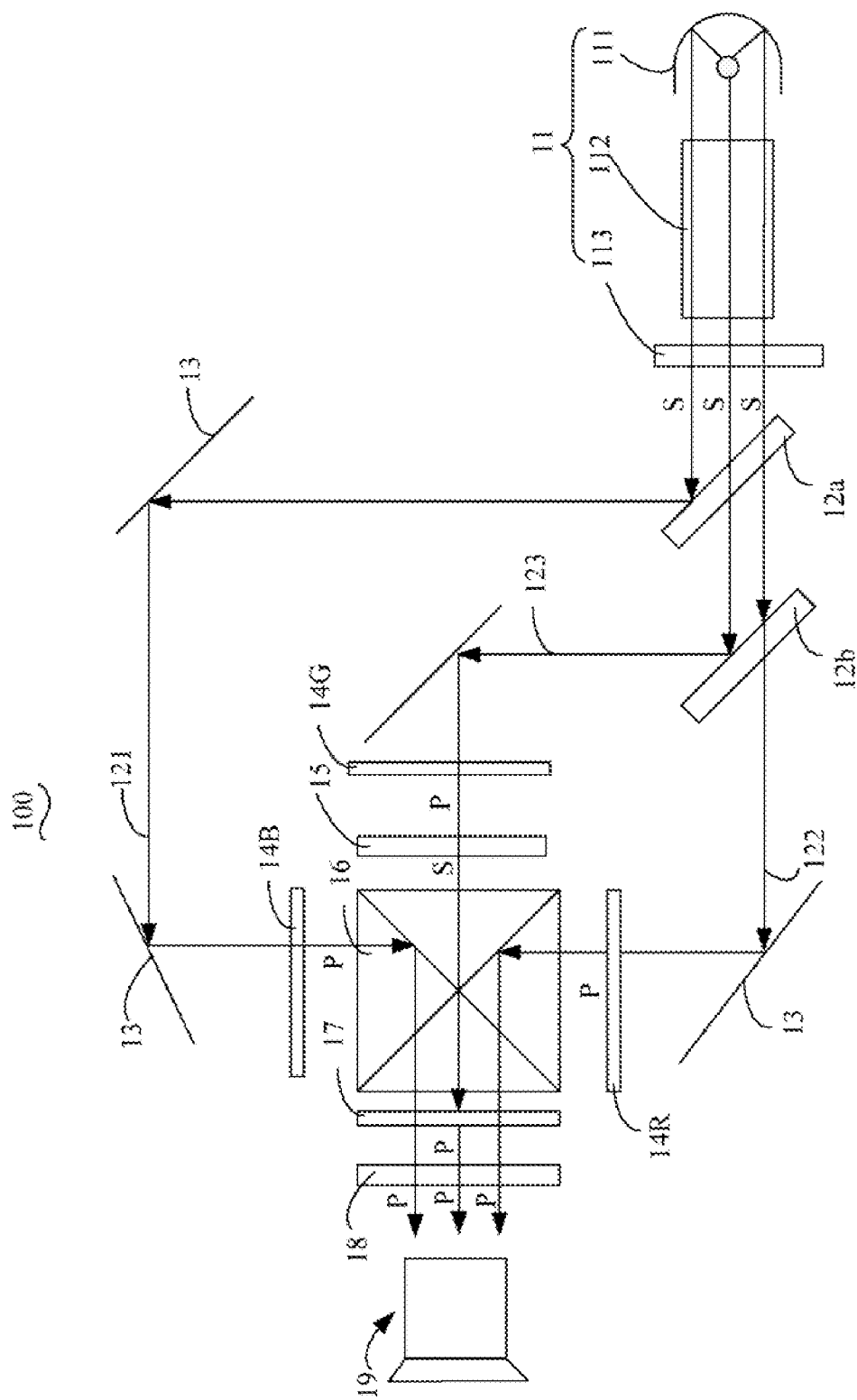
FIG. 1 is a schematic view of a configuration of a stereo projection optical system in accordance with a first embodiment of the present invention, wherein a transmission-type light modulator is in a light state.
Figure 2:
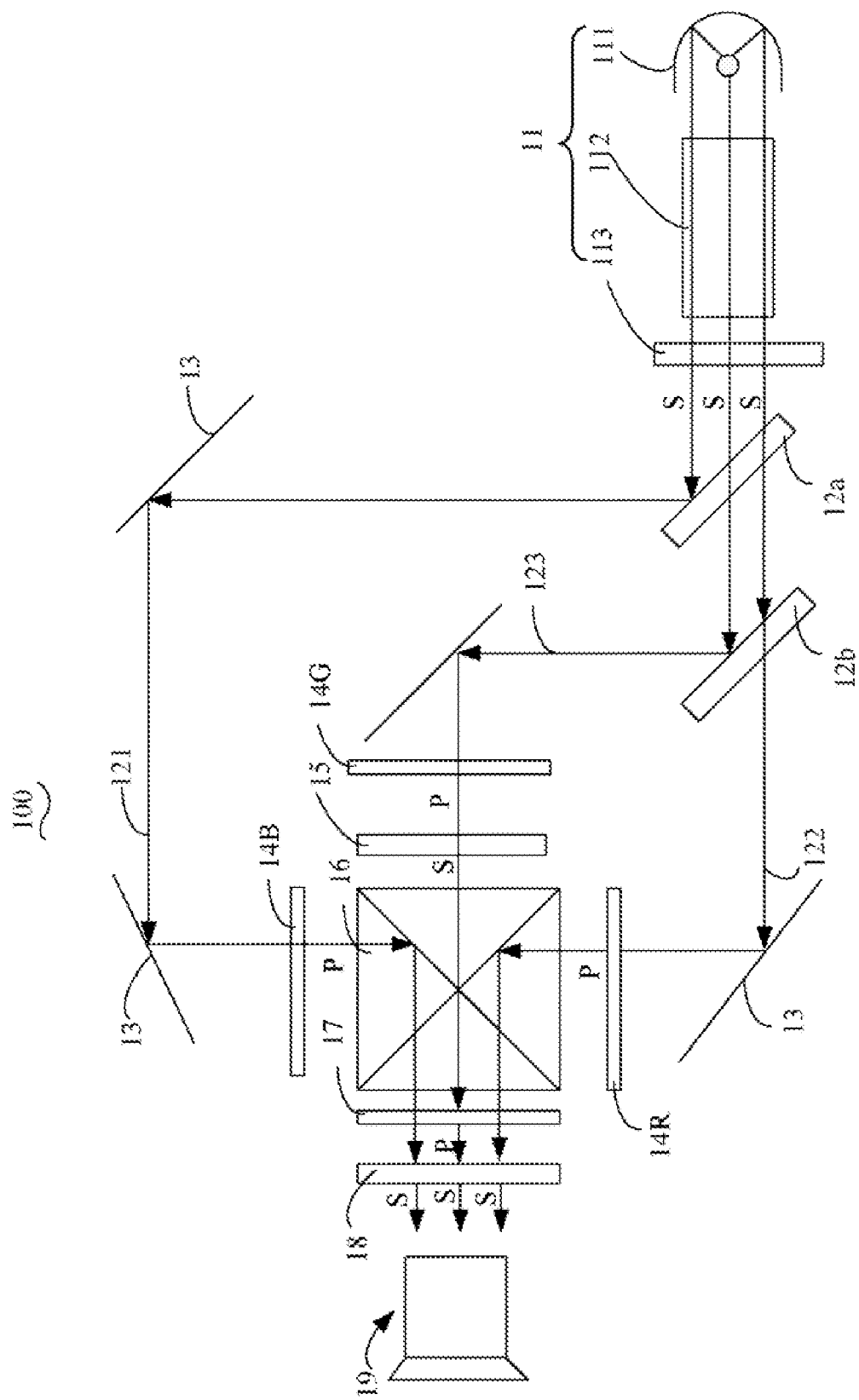
FIG. 2 is a schematic view of the stereo projection optical system of FIG. 1, wherein the transmission-type light modulator is in a dark state.

Referring to FIG. 1 and FIG. 2, a stereo projection optical system 100 according to a first embodiment in the present invention is shown. The stereo projection optical system 100 includes a light source assembly 11, first, second light separators 12a, 12b, a plurality of reflective apparatuses 13, three image assimilators 14R, 14G, 14B, a light combiner 16, a retarder 15, a color selector 17, a transmission-type light modulator 18 and a projecting lens 19.

It should be noted that the light source assembly 11, the first, second light separators 12a, 12b, the reflective apparatus 13, the three image assimilator 14R, 14G, 14B, the retarder 15 and the light combiner 16 function as an image engine configured for emitting light beams superimposed spatial information.

The light source assembly 11 includes a light source 111, a integrator 112 disposed in a light path of light emerging from the light source 111, and a polarization conversion system (herein called a converter) 113 disposed in a light path of the light output from the integrator 112. The light source 111 can be a halogen lamp, a metal halogen lamp, a light emitting diode (LED), and the like. In the present embodiment, the light source 111 is a halogen lamp that emits white light. The integrator 112 is configured for effectively collecting the light of the light source 111 and outputs the light uniformly. The converter 113 is configured for converting the white light from the integrator 112 into P-polarized light or S-polarized light. In the present embodiment, the converter 113 converts the white light from the integrator 12 into S-polarized light and outputs the S-polarized light.

The first light separator 12a is positioned to receive a light beam originating from the light source assembly 31, separates the light beam into two or more light components and emits two or more light components. In the present embodiment, the first light separator 12a is positioned to receive a light beam comprising a first component 121, a second component 122, and a third component 123. The first, second, and third components 121, 122 and 123 can be red, green, and blue components. In the present embodiment, the first component 121 is a red component, the second component 122 is a green component and the third component 123 is a blue component.

The first light separator 12a is configured for reflecting the first component 121, and transmitting the second component 122 and the third component 123. And the second separator 12b is positioned to receive the second, third components 122, 123 transmitted by the first separator 12a. The second separator 12b is configured for reflecting the second component 122 and transmitting the third component 123. Each of the first, second separators 12a, 12b can be dichroic mirror, dichroic beam-splitter, plate dichroic prism coupled with an optical retarder. In the present embodiment, the first, second separators 12a, 12b are dichroic mirrors.

The reflective apparatuses 13 can be mirrors and is respectively disposed between the first, second light separator 12a, 12b and the three image assimilators 14G, 14B, and 14R. In the present embodiment, three reflective apparatuses 13 are employed and configured for reflecting the first, second, and third component 121, 122, and 123 emitted respectively from the first, second light separators 12a, 12b into the corresponding image assimilators 14R, 14G, 14B.

The image assimilators 14R, 14B, 14G can be transmission-type spatial light modulators. The image assimilator 14B is positioned to receive the first component 121 and configured for modifying the polarization of the first components 121 in a predetermined manner and superimposing spatial information on the first components 121 so as to produce a light beam that includes spatial information. The image assimilator 14B outputs the first component 121 with a polarization that is substantially orthogonal to the polarization of the first component 121 as it inputs to the image assimilator 14B. The modified first component 121 is transmitted by the image assimilator 14B to the light combiner 16. The image assimilators 14R, 14G respectively superimpose spatial information on the second, third components 122, 123 so as to produce light beams including spatial information and transmit a modified second, third components 122, 123 to the light combiner 16.

The retarder 15 is disposed between the image assimilators 14G and the light combiner 16 and configured for converting the polarization of the third component 123. In particular, the polarization of the first component 123 when it exits the retarder 15 is substantially orthogonal to the polarization of the first component 123 when it enters the retarder 15. The retarder 15 is typically a half-wave retarder or two overlapped quarter-wave retarders.

The light combiner 16 is disposed in the light path of the light output from the image assimilators 14R, 14B, 14G and is configured for combining the first, second and third components 121, 122, and 123 to produce a single light output. The light combiner 16 can be a dichroic beam splitter or an X-prism. Where the light combiner 16 is an X-prism, it may include one or more dichroic filters and may also include a polarizing beam splitter (PBS). When the light combiner 16 is an X-prism, it may include one or more dichroic filters and may also include a polarizing beam splitter. It should be noted that the X-prism is an optical element having two internal planes that lie substantially orthogonal to one another. In the present embodiment, the two planes are dichroic filters configured for substantially transmitting light having a first wavelength and substantially reflecting light having a second wavelength.

The color selector 17 is disposed in the light path of the emergent light of the light combiner 16 and is configured for selectively modifying the polarization of the first, second and third components 121, 122 and 123 according to their wavelengths so that the light output from the color selector 17 is linearly polarized, with the polarization direction for each color band is substantially the same as that of each other color bands. In the present embodiment, the color selector 17 modifies the polarization of the third component 123.

Figure 3:
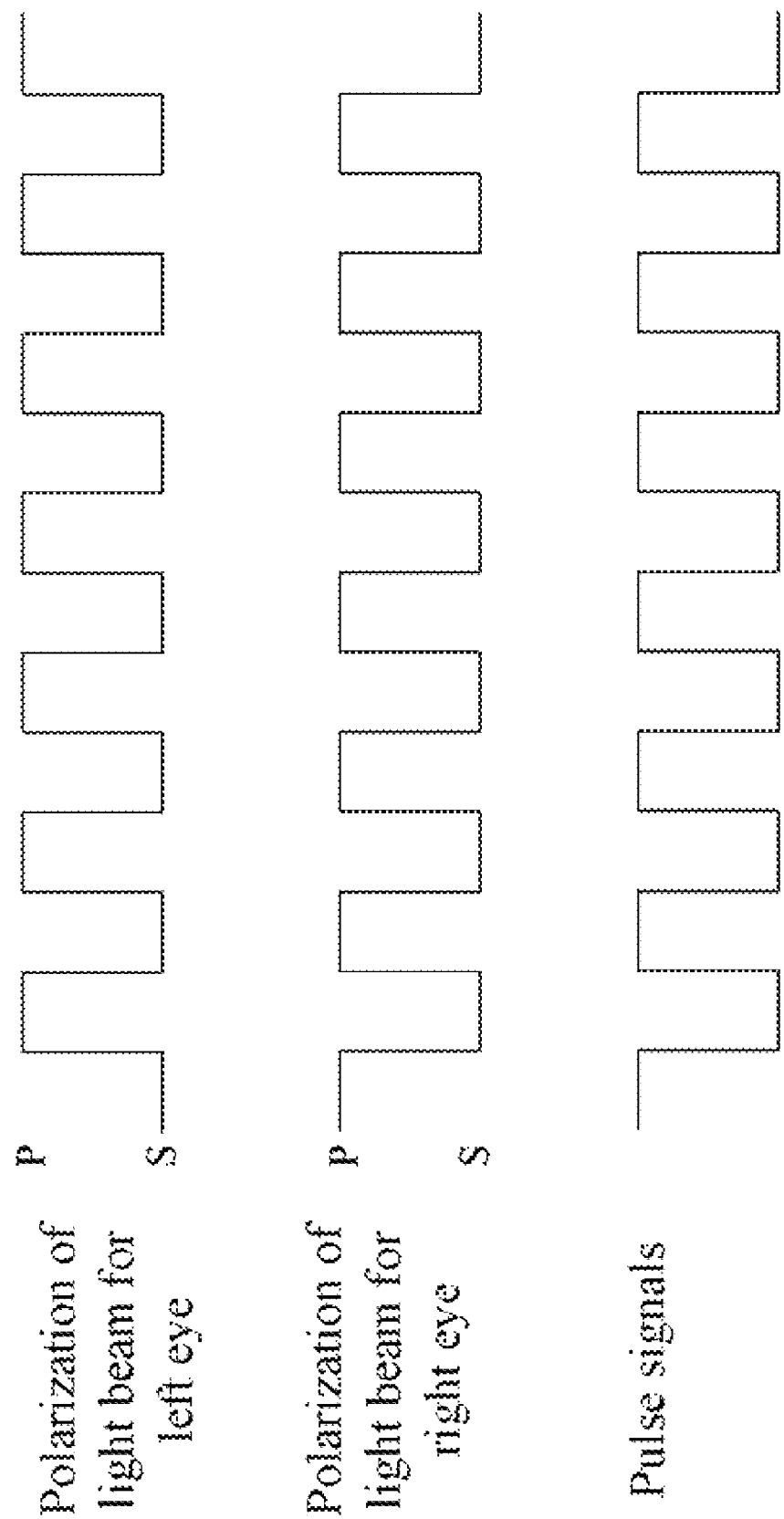
FIG. 3 is a wave diagram of a pulse signal input into the transmission-type light modulator of FIG. 1 and polarization of emergent light beams forming images for left and right eyes.

The transmission-type light modulator 18 can be a liquid crystal panel and is positioned to receive the emergent light of the color selector 17. On and off of the transmission-type light modulator 18 is controlled by pulse signals input into it. Referring to FIG. 3, the pulse signals input into the transmission-type light modulator 18 are shown. The transmission-type light modulator 18 switchably operates between a dark state and a bright state under the control of the pulse signals and emits the P-polarized light and the S-polarized light alternatively to produce stereoscopic images for left and right eyes of viewer, as shown in FIG. 3. When the transmission-type light modulator 18 is in bright state, as shown in FIG. 1, the P-polarized light directly passes through the transmission-type light modulator 18 with substantially no change in polarization. Otherwise, when the light modulator 18 is in dark state, as shown in FIG. 2, the P-polarized light is converted into the S-polarized light and the S-polarized light is emitted from the light modulator 18. In this manner, left-eye and right-eye images are formed and then projected onto a screen (not shown) in an alternating manner. When the frequency of alternation is sufficiently fast, the left-eye and right-eye images may appear to a viewer as a single stereographic image.

The projecting lens 19 is configured for receiving the light output of the transmission-type light modulator 18 and magnifying and projecting an image formed by the light output on a screen (not shown).

Figure 4:
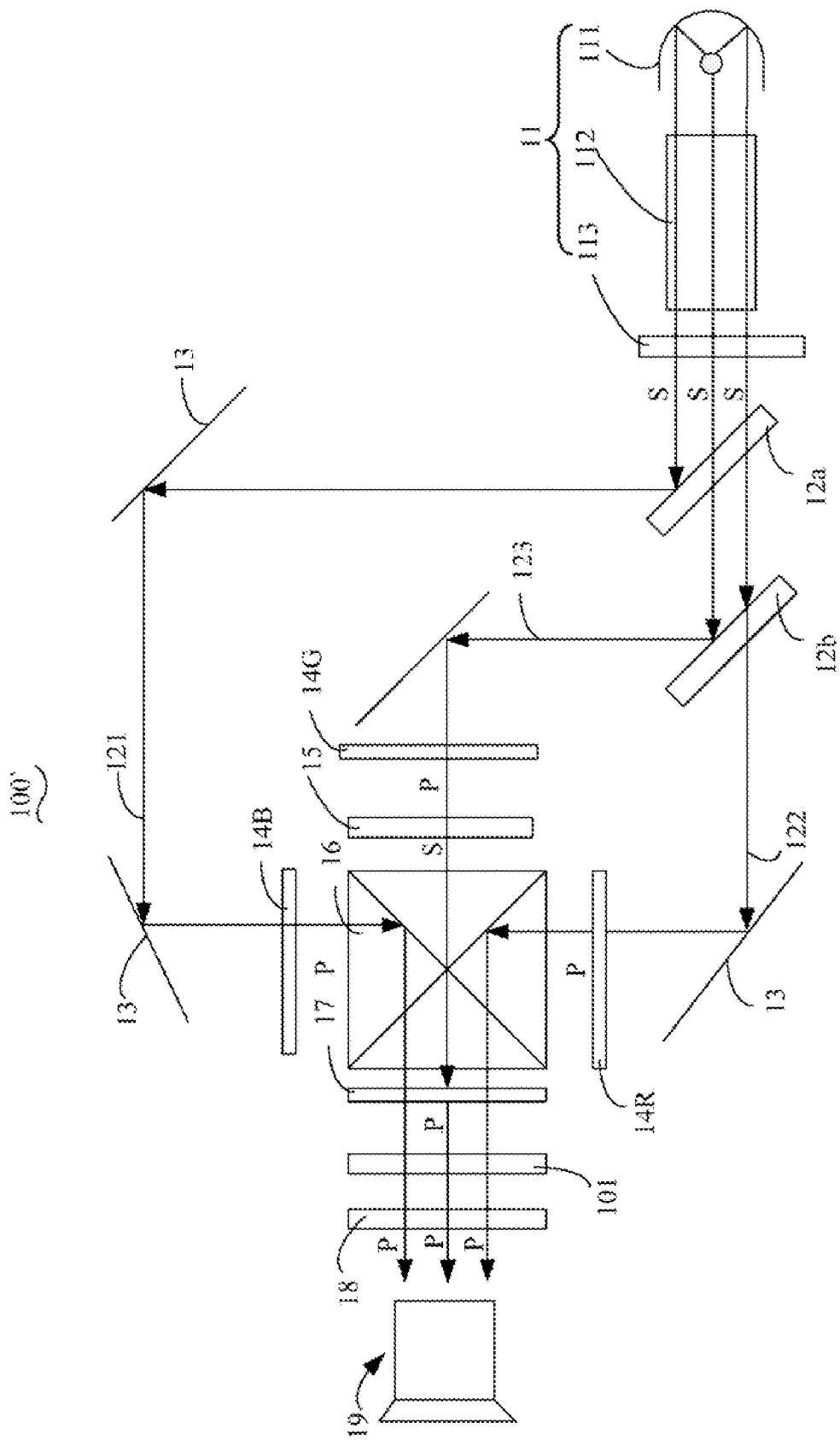
FIG. 4 is similar to FIG. 1, but further illustrates an analyzer disposed in the stereo projection optical system.

It should be understood that the stereo projection optical system 100' can also include a plurality of analyzers 101 in order to promote contrast of images projected by the stereo projection optical system. In the present embodiment, the stereo projection optical system 101' includes an analyzer 101 and is disposed between the color selector 17 and the transmission-type light modulator 18. Referring to FIG. 4, this shows an analyzer 101 in a stereo projection optical system 100'. The analyzer 101 can be a polarizer, which is configured for transmitting light of a predetermined polarization direction and blocking light of other polarization direction. In alternative embodiment, the analyzer 101 can have other desired light processing characteristics. In the present embodiment, the analyzer 101 transmits P-polarized light and removes S-polarized light. The analyzers 101 can be disposed in any one or more of the following positions: between the image assimilators 14R, 14B, 14G and the light combiner 16, and between the color selector 17 and the transmission-type light modulator 18.

Figure 5:
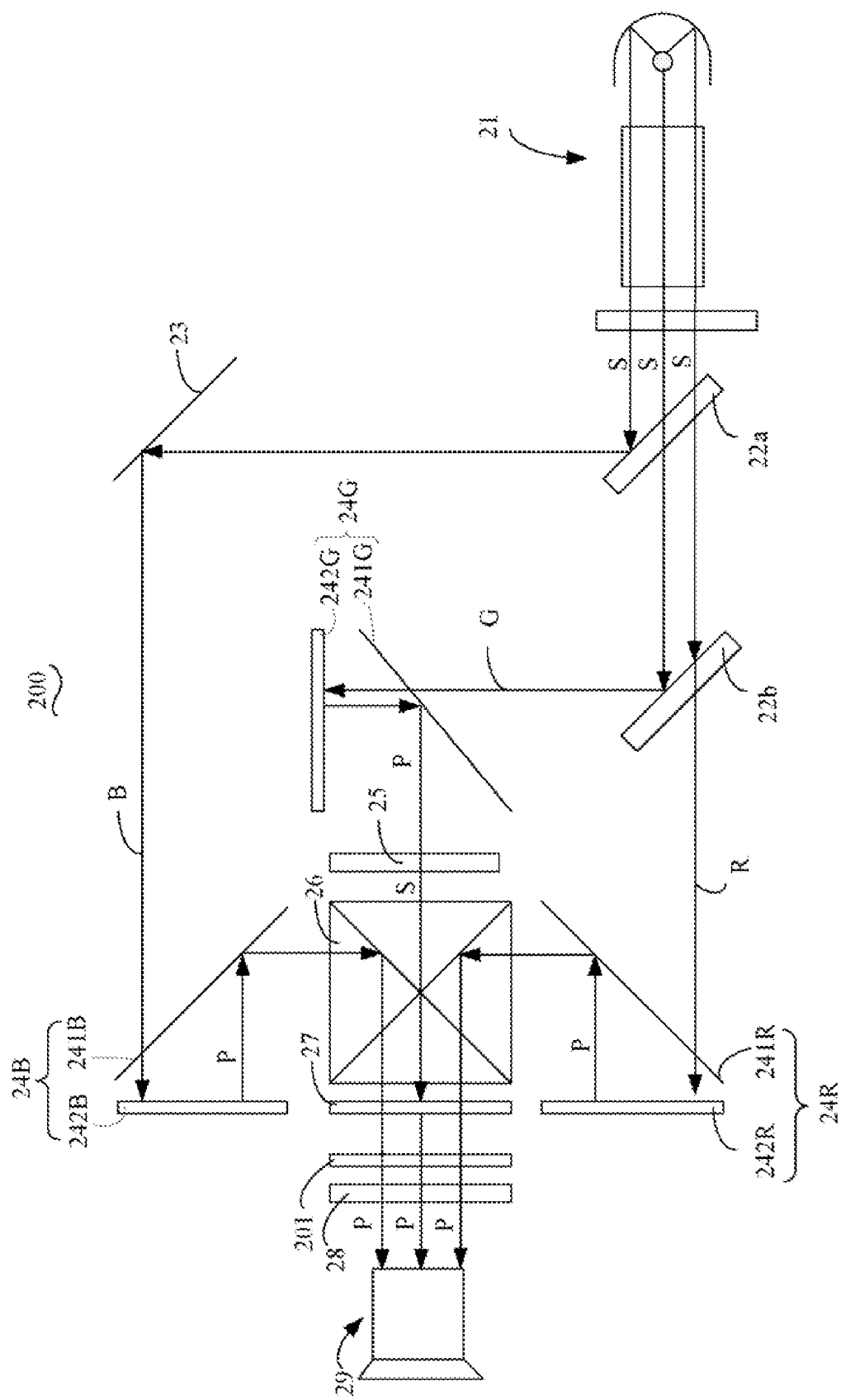
FIG. 5 illustrates a configuration of a stereo projection optical system in accordance with a second embodiment of the present invention.

Referring to FIG. 5, a stereo projection optical system 200 according to a second embodiment in the present invention is shown. The stereo projection optical system 200 is similar to the stereo projection optical system 100 of the first embodiment. However, the stereo projection optical system 200 includes a light source assembly 21, a first and a second light separator 22a, 22b, a reflective apparatuses 23, three image assimilators 24R, 24G, 24B, a light combiner 26, a retarder 25, a color selector 27, a transmission-type light modulator 28, and a projecting lens 29.

In this embodiment, the light source assembly 21, the first, second light separators 22a, 22b, the reflective apparatuses 23, the three image assimilators 24R, 24G, 24B, the light combiner 26, and the retarder 25 function as an image engine.

Difference between the first embodiment and the second embodiment is that the three image assimilators 24R, 24G, 24B respectively include three PBSs 241R, 241G, 241B and three reflective spatial light modulators 242R, 242G, 242B. Now the image assimilator 24B is presented only as an example to explain configuration and work principle of the three image assimilators 24R, 24G, 24B.

It should be noted that the first and second light separators 22a, 22b respectively emit a first, second, and third component 221, 222, 223 to superimpose spatial information on it. The first component 221 passes through the PBS 241B and reaches the reflective spatial light modulator 242B. The reflective spatial light modulator 242B is configured for modifying the polarization of the first components 221 in a predetermined manner and superimposing spatial information on the first components 121 so as to produce a light beam that includes spatial information. The image assimilator 24B emits the first component 221 whose polarization is substantially orthogonal to the polarization of the first component 221 when it reaches the image assimilator 24B. The modified first component 221 is transmitted by the image assimilator 24B to the light combiner 26. At this time, the modified second, third components 222, 223 are transmitted by the image assimilators 24R, 24G to the light combiner 26.

Similar to first embodiment, the system 200 an analyzer 201 disposed between the color selector 27 and the transmission-type light modulator 28 in order to promote contrast of the images projected by the stereo projection optical system 200. It should be understood in alternative embodiment, any one, more or all of the analyzers 27 can be omitted.

Figure 6:
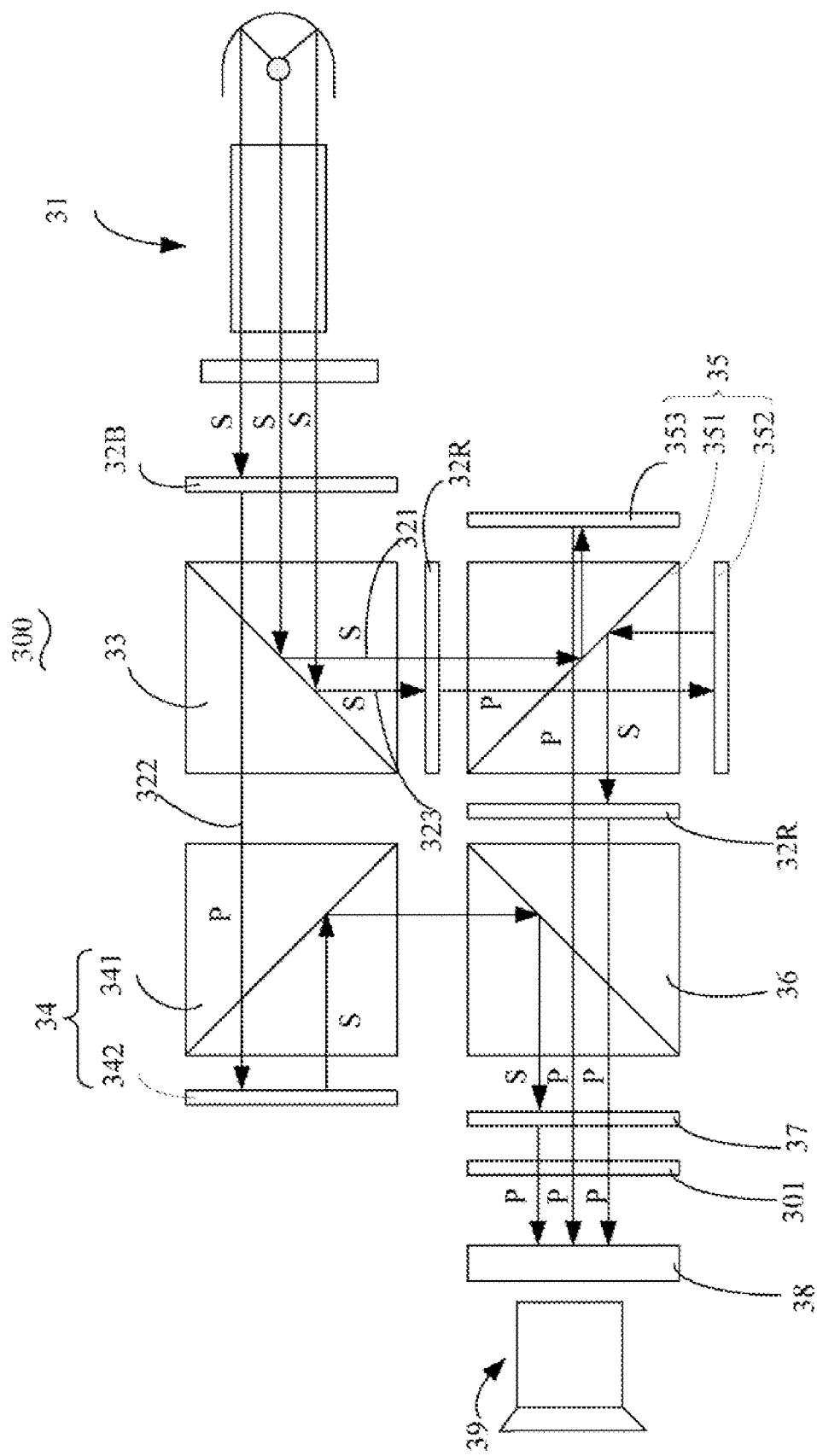
FIG. 6 illustrates a configuration of a stereo projection optical system in accordance with a third embodiment of the present invention.
Figure 7:
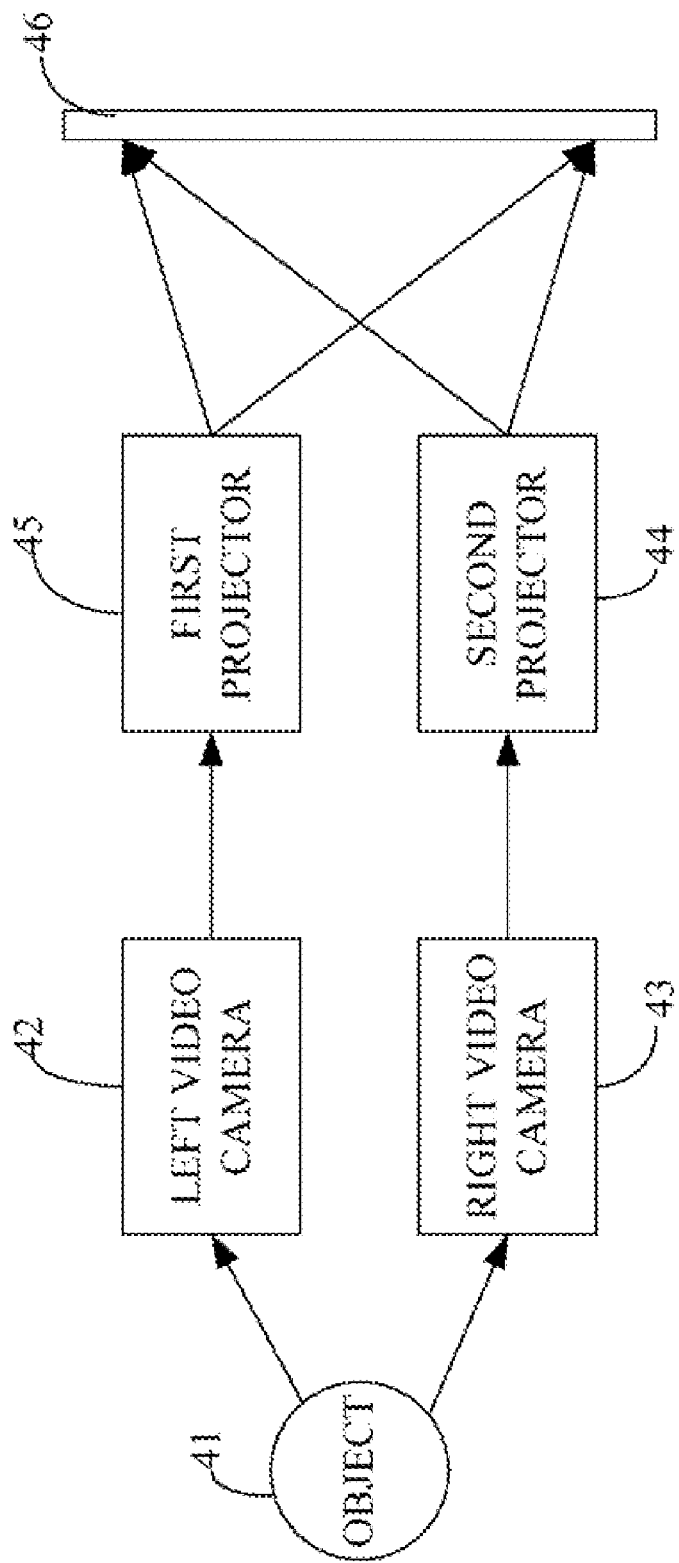
FIG. 7 is illustrates a block diagram of a configuration of a conventional stereoscopic image display apparatus.

Referring to FIG. 6, a stereo projection optical system 300 according to a third embodiment is shown. The stereo projection optical system 300 includes a light source assembly 31, a blue-retarder 32B, a first PBS 33, a first image assimilator 34 having a second PBS 341, a second image assimilator 35 having a third PBS 351, and a light combiner 36, two red-retarder 32R, a color selector 37 and a projecting lens 38.

In this embodiment, the light source assembly 31, the blue-retarder 32B, the first PBS 33, the first image assimilator 34, the second image assimilator 35, a light combiner 36, and the two red-retarder 32R function as an image engine configured for emitting light beams having spatial information.

Configurations and work principle of the blue-retarder 32B and the red-retarder 32R is substantially similar to that of the color selector 17 of the first embodiment. Difference of the blue-retarder 32B, the red-retarder 32R and the color selector 17 is that the blue-retarder 32B and the red-retarder 32R respectively change the polarization direction of the blue, red light component to be substantially orthogonal when it exits out of the retarder 15 compared to when it went in.

Configurations and working principle of other optical elements, such as the light source assembly 31, the projection lens 39 and the like, are substantially same with that of optical elements of the first embodiment or the second embodiment. It should be note that the first image assimilator 34 also includes a reflective spatial light modulator 342, and the second image assimilator 35 includes two reflective spatial light modulators 352, 353.

As illustrated in FIG. 6, the polarized light beams emitted by the light source assembly 31 include three components comprising a red components 321, a blue component 322 and a green component 323. Polarizations of the polarized light beams from the light source assembly 31 can be S-polarized. It can be understood that polarization of the polarized light beams can be P-polarized.

The S-polarized blue component 322 is converted into a P-polarized blue component by the blue-retarder 32B and transmits from the second PBS 341 of the first image assimilator 34, and reaches the reflective spatial light modulator 342. The reflective spatial light modulator 342 changes the P-polarized blue component into the S-polarized blue component 322 and superimposes spatial information on it. The blue component 322 having spatial information passes through the second PBS 341 and is emitted from the light combiner 36.

The S-polarized red components 321 pass through the blue-retarder 32B and the first PBS 33 and arrive at the red-retarder 32R. The S-polarized red 321 is converted into a P-polarized red component 321 by the red-retarder 32R and reaches the second image assimilator 35. The reflective spatial light modulator 352 changes the P-polarized red component 321 into the S-polarized red component and superimposes spatial information on it. The P-polarized red component 321 is converted into the S-polarized red component 321 by the red-retarder 32R disposed between the second image assimilator 35 and the light combiner 36 and is emitted from the light combiner 36.

The S-polarized green component 323 passes through the blue-retarder 32B, the first PBS 33, the red-retarder 32R and the third PBS 351 of the second image assimilator 35 and reaches the reflective spatial light modulator 353. The reflective spatial light modulator 353 changes the S-polarized green component 323 into the P-polarized green component 323 and superimposes spatial information on the P-polarized green component 323. The P-polarized green component 323 passes through the red-retarder 32R and the light combiner 36 and is emitted from the light combiner 36.

The modified red, blue, and green components 321, 322, 323 emitted from the light combiner 36 transmit from the color selector 37 and the transmission-type light modulator 38 and arrive at the projecting lens 39. As stated in the first and second embodiment, the projecting lens 39 can alternatively project an image formed by the S-polarized or P-polarized red, blue and green components 321, 322, 323.

As described in the first, and second embodiment, the system 300 also an analyzer 301 disposed between the color selector 37 and the transmission-type light modulator 38 in order to promote contrast of the projected images of the system 300.

In each of the above-described stereo projection optical systems 100, 100'200, and 300, the image engineers provide viewers three-dimensional images generated by two alternative polarization light beams whose polarizations are perpendicular to each other. From the foregoing, it will be apparent that the stereo projection optical system according to the present invention provides advantages in that its structure can be simplified with the reduction of its size by synthesizing left and right image signals by displaying the stereoscopic image signal using a single projector.

It should be understood that the above-described embodiments are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A stereo projection optical system, comprising:
an image engine configured for providing light superimposed spatial information;
a color selector positioned to receive a light output of the image engine and configured for selectively modifying the polarization of the light output according to the wavelength of the light output;
a transmission-type light modulator positioned to receive an emergent light of the color selector, the transmission-type light modulator switchably operating between a dark state in which the transmission-type light modulator transmits the emergent light with no change in polarization and a bright state in which the transmission-type light modulator converts polarization of the emergent light into a light beam polarization of which is orthogonal to that of the emergent light and emits the light beam; and wherein the image engine comprises a light source assembly, first and second light separators positioned to receive the light outputs from the light source assembly, three image assimilators positioned to receive the light outputs form the first and second light separators, at least a reflective apparatus disposed between one of the image assimilators and one of the light separators, a light combiner positioned to receive the light outputs of the image assimilators and a retarder disposed between one of the image assimilators and the light combiner.

2. The stereo projection optical system as claimed in claim 1, wherein the first and second light separators are dichroic mirrors.

3. The stereo projection optical system as claimed in claim 1, wherein the first and second light separators are dichroic beam-splitters.

4. The stereo projection optical system as claimed in claim 1, wherein the first and second light separators are plate dichroic prisms each coupled with an optical retarder.

5. The stereo projection optical system as claimed in claim 1, wherein the image assimilator is a transmission-type spatial light modulator.

6. The stereo projection optical system as claimed in claim 5, wherein the transmission-type spatial light modulator is a liquid crystal display.

7. The stereo projection optical system as claimed in claim 1, wherein the image assimilator comprises a polarizing beam splitter and a reflective spatial light modulator.

8. The stereo projection optical system as claimed in claim 7, wherein the polarizing beam splitter is a wire grid polarizer.

9. The stereo projection optical system as claimed in claim 7, wherein the polarizing beam splitter is a polarizing beam splitter prism.

10. The stereo projection optical system as claimed in claim 9, wherein the reflective spatial light modulator is a liquid crystal on silicon.

11. The stereo projection optical system as claimed in claim 1, wherein the image engine comprises a light source assembly, a blue-retarder positioned to receive the light output of the light source assembly and configured for changing polarization of a blue component, a polarizing beam splitter positioned to receive the light output of the blue-retarder and configured for separating the light output into a first polarized light component and a second polarized light component which is orthogonal to the first polarized light component, a first image assimilator positioned to receive the first polarized light component, a second image assimilator positioned to receive the second polarized light component, and a light combiner positioned to receive emergent lights of the first and second image assimilators, two red-retarders respectively disposed between the polarizing beam splitter and the first image assimilator, and the first image assimilator and the light combiner.

12. The stereo projection optical system as claimed in claim 11, wherein the first image assimilator includes a polarizing beam splitter and two reflective spatial light modulators positioned to respectively receive the light output of the polarizing beam splitter.

13. The stereo projection optical system as claimed in claim 11, wherein the second image assimilator includes a polarizing beam splitter and a reflective spatial light modulator positioned to receive the light output of the polarizing beam splitter.

14. The stereo projection optical system as claimed in claim 1, further comprising an analyzer disposed between the color selector and the transmission-type light modulator.

15. An optical system for use in a stereo projector, comprising:

an image engine configured for producing a first, second, and third polarized color lights which are superposed with corresponding spatial information, a polarization direction of the first polarized color light being orthogonal to that of the second and third polarized color lights;

a color selector positioned to receive the polarized color lights and configured for altering the polarization direction of the first polarized color light into that of the second and third polarized lights and leaving unchanged the polarization direction of the second and third polarized lights respective wavelengths of the polarized color lights;

a transmission-type light modulator positioned to receive the polarized color lights, allowing the polarized color light passing therethrough, and configured for switchably operating between a dark state, in which the polarization directions of the polarized color lights are left unchanged, and a bright state, in which the polarization directions of the polarized color lights are 90 degrees rotated; and wherein the image engine comprises:

a light source assembly configured for generating the polarized color lights;

a plurality of light separators and reflectors for separating and redirecting the polarized color lights to travel in separated paths, three image assimilators positioned to receive the respective polarized color lights and superposing respective spatial information thereon; and a light combiner positioned to receive the polarized color lights and configured for redirecting the polarized color lights to travel in the same path.

16. The optical system of claim 15, wherein the transmission-type light modulator and the image assimilators are transmission-type liquid crystal displays.

* * * * *

UNITED STATES PATENT AND TRADEMARK OFFICE
CERTIFICATE OF CORRECTION

| | |
|---|---|
| PATENT NO. | : 8,164,620 B2 |
| APPLICATION NO. | : 11/952982 |
| DATED | : April 24, 2012 |
| INVENTOR(S) | : Chien-Wen Hsu et al. |

It is certified that error appears in the above-identified patent and that said Letters Patent is hereby corrected as shown below:

Please replace Section (73) regarding "Assignees" on the front page of the Patent with the following:

(73) Assignees: Hon Hai Precision Industry Co., Ltd., Tu-Cheng, New Taipei (TW).

Signed and Sealed this
Second Day of October, 2012

David J. Kappos
*Director of the United States Patent and Trademark Office*